John O. Taylor
INVENTOR.

Oct. 28, 1969
J. O. TAYLOR
3,475,008
TRAILER JACK
Filed Sept. 11, 1967
2 Sheets-Sheet 2
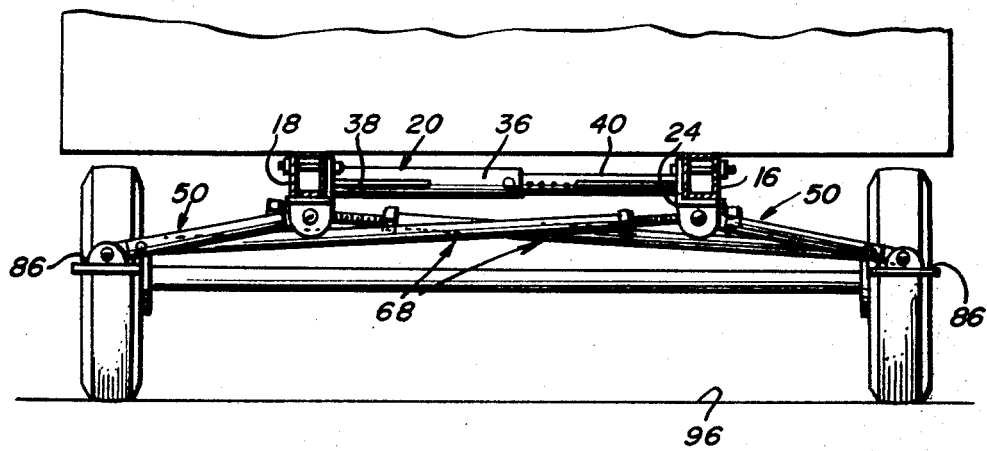
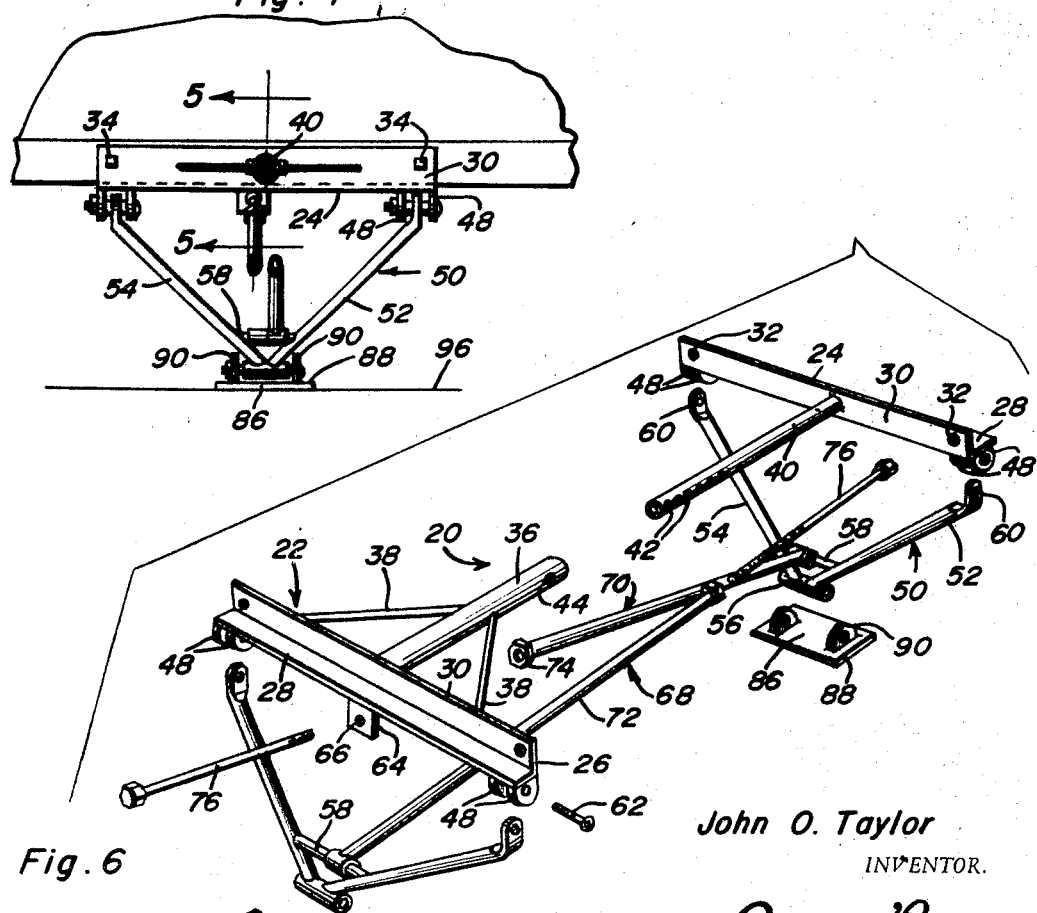
John O. Taylor
INVENTOR.

United States Patent Office 3,475,008
Patented Oct. 28, 1969

3,475,008
TRAILER JACK
John O. Taylor, P.O. Box 36, Washington, Kans. 66968
Filed Sept. 11, 1967, Ser. No. 666,863
Int. Cl. B60s 9/02
U.S. Cl. 254—86        9 Claims

ABSTRACT OF THE DISCLOSURE

A vehicle frame leveling structure including downwardly and outwardly inclined supporting legs pivotally secured at their upper ends to corresponding sides of the associated frame for rotation about axes extending longitudinally of the frame and a pair of adjustable length members pivotally secured at one pair of corresponding ends to opposite side portions of the associated frame and pivotally secured at their other ends to the lower ends of the support legs carried by the opposite side portions of the frame.

---

The jack structure of the instant invention has been primarily designed for use in leveling house trailer frames and the like and each jack structure includes a pair of upstanding legs for supporting the weight of opposite side portions of the associated house trailer and a pair of adjustable length members pivotally secured at one pair of corresponding ends to the lower ends of the support legs of the jack structure and at their other pair of corresponding ends to the opposite side portion of the associated trailer frame. In this manner, each jack structure not only supports at least a portion of the weight of the associated frame but also provides a means whereby double crossed bracing is provided resisting lateral shifting of the frame relative to the ground from which it is supported. Accordingly, it may be seen that when a plurality of the jack structures of the instant invention are utilized and spaced longitudinally of an associated frame, an extremely rigid supporting and bracing assembly is provided.

The main object of this invention is to provide a house trailer jack structure that may be readily utilized to properly elevate and support various spaced portions of a house trailer frame.

Another object of this invention is to provide a jack structure in accordance with the immediately preceding object and constructed in a manner whereby the jack structure is supported solely from the associated house trailer frame and may be elevated relative to the latter to an out-of-the-way position during transit of the house trailer frame.

A still further object of this invention is to provide a jack structure which will be capable of leveling a house trailer frame when the latter is disposed over uneven ground.

A final object of this invention to be specifically enumerated herein is to provide a trailer jack in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a transverse sectional view similar to FIGURE 2 but with the jack structures carried by the house trailer frame being disposed in a raised inoperative position;

FIGURE 4 is a fragmentary longitudinal sectional view taken substantially upon the plane indicated by the section line 4—4 of FIGURE 2;

FIGURE 6 is an exploded perspective view of one of the jack structures.

Figure 1:
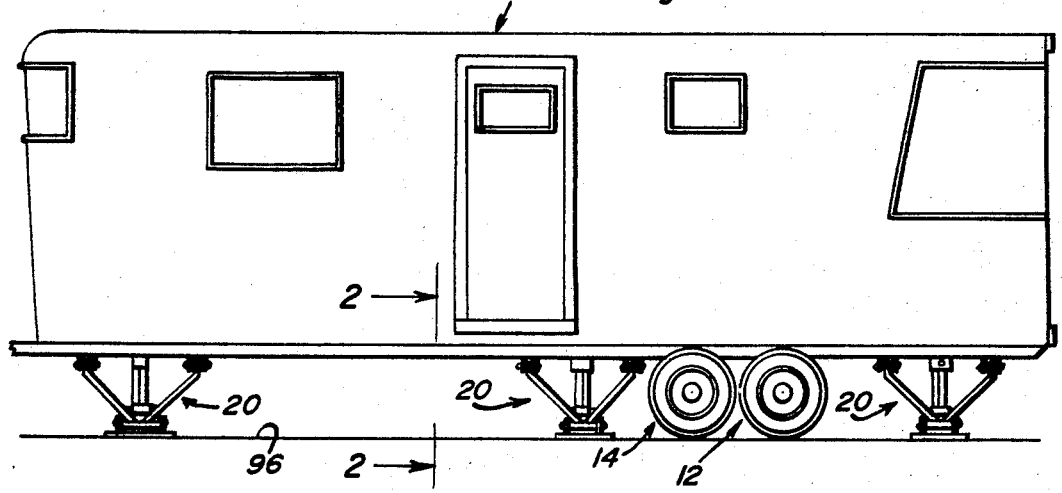
FIGURE 1 is a side elevational view of a conventional form of house trailer with whose frame a plurality of the jack structures of the instant invention are operatively associated.

Referring now more specifically to the drawings the numeral 10 generally designates a conventional form of house trailer including a pair of wheeled axle assemblies generally referred to by the reference numerals 12 and 14 and which are supported from a pair of opposite side longitudinal frame members 16 and 18 in any convenient manner (not shown). Of course, the wheeled axle assemblies 12 and 14 are conventionally supported from the frame members 16 and 18 by means of spring assemblies and the axle assemblies 12 and 14 support the house trailer 10 for movement over the road.

When the house trailer 10 is to be stationarily positioned for any length of time, it is conventional to provide means whereby at least some of the weight of the trailer 10 will be lifted from the axle assemblies 12 and 14 and whereby the frame of the trailer 10 including the frame members 16 and 18 may be supported at points spaced longitudinally therealong for the purpose of steadying the trailer 10 independently of the sprung axle assemblies 12 and 14. By bracing the frame members 16 and 18 in this manner, persons may move about within the trailer 10 without the latter tilting to one side or the other or to either end.

When jack means are utilized to support and brace the frame members 16 and 18 at points spaced longitudinally therealong, such jack means are constructed in a manner whereby the desired bracing and supporting of the frame members 16 and 18 may be achieved even though the trailer 10 is disposed over an uneven supporting surface.

The trailer jack of the instant invention may be used singly and disposed at the forward end of the trailer so as to provide a reasonable amount of bracing and support in an economy installation. However, it is intended that to obtain the best results a plurality of the jack assemblies of the instant invention will be supported from the trailer 10 at points spaced longitudinally therealong both forward of the axle assemblies 12 and 14 and in at least one position disposed rearwardly of the axle assemblies 12 and 14.

Inasmuch as the jack assemblies or structures illustrated in FIGURE 1 of the drawings are substantially identical, only one of the jack structures will be hereinafter described in detail.

Figure 2:
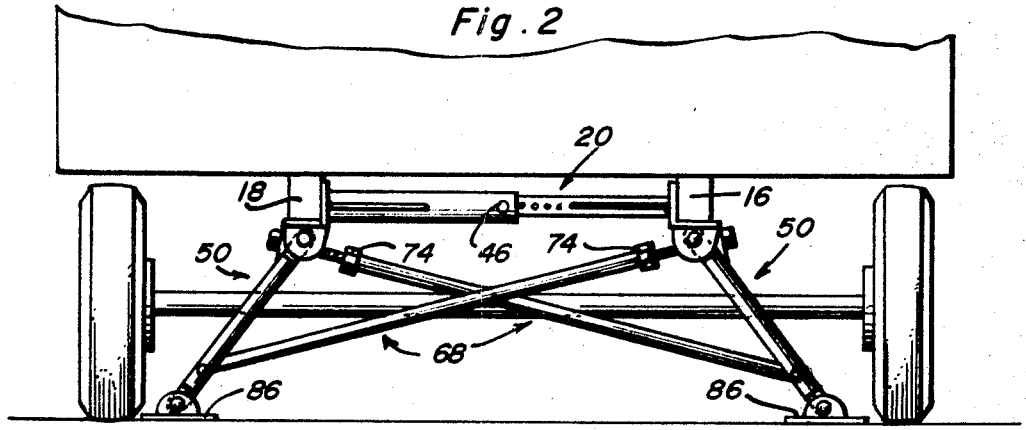
FIGURE 2 is a fragmentary enlarged transverse sectional view taken substantially upon the plane indicated by the section line 2—2 of FIGURE 1.
Figure 5:
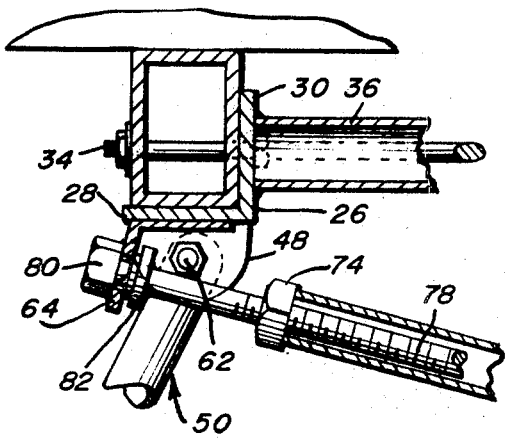
FIGURE 5 is a fragmentary enlarged transverse sectional view taken substantially upon the plane indicated by the section line 5—5 of FIGURE 4.

With attention now invited more specifically to FIGURES 2, 5 and 6 of the drawings, it may be seen that the jack structure is generally referred to by the reference numeral 20 and that it includes a mounting structure referred to in general by the reference numeral 22. The mounting structure 22 includes a pair of angle irons 24 and 26 each including a horizontal flange 28 and a vertical flange 30 apertured as at 32. The angle irons 24 and 26 are mounted in the positions thereof illustrated in FIGURE 2 of the drawings with the vertical flanges or flange portions 30 thereof secured to the frame members 16 and 18 by means of suitable fasteners 34 secured through the apertures 32 and the frame members 16 and 18. The angle irons 24 and 26 embracingly engage the lower inner corner portions of the longitudinal frame members 16 and 18 with the vertical flange portions 30 extending along the inner surface portions of the frame members 16 and 18 and the horizontal flange portions 28 disposed immediately beneath the undersurfaces of the longitudinal frame members 16 and 18.

The angle iron 26 has a large diameter tube 36 secured to the vertical flange portion 30 thereof intermediate its opposite ends and the tube 36 projects toward the angle iron 24 and is braced by means of diagonal bracing members 38. The vertical flange portion 30 of the angle iron 24 has one end of a small diameter tube 40 secured thereto and the tube 40 projects toward the angle iron 26 and is telescoped in the end of the tube 36 remote from the angle iron 26. The tube 40 includes a plurality of longitudinally spaced diametric bores 42 with which a diametric bore 44 formed in the free end of the tube 36 is selectively registrable. A suitable fastener 46 is secured through the bore 44 and a selected bore 42 in order to secure the transverse brace member defined by the tubes 36 and 40 in adjusted extended position. Of course, the adjustability of the transverse brace member is provided so that the jack structure 20 will be adapted for securement to trailers whose longitudinal frame members are spaced varied distances apart.

Each of the horizontal flange portions 28 includes pairs of opposite end depending and apertured mounting lugs 48 and a V-shaped support leg generally referred to by the reference numeral 50 is pivotally supported from each angle iron 24 and 26. Each of the support legs 50 includes a pair of divergent arms 52 and 54 interconnected at one pair of corresponding ends by means of a sleeve 56 extending therebetween forming the apex portion of the corresponding support leg 50. In addition, each of the support legs 50 includes a transverse brace 58 adjacent the corresponding sleeve 56 and which is also connected between the arms 52 and 54.

The free ends of the arms 52 and 54 of each support leg 50 include angulated and apertured end portions 60 which are secured between the corresponding pairs of mounting lugs 58 by means of pivot fasteners 62. In addition, a depending mounting flange portion 64 is carried by the center of each horizontal flange portion 28 and is apertured as at 66.

A pair of adjustable length brace members generally referred to by the reference numerals 68 and 70 are provided and each brace member 68 includes an elongated base end portion 72 pivotally secured to the corresponding transverse brace 58 at one end and having a threaded nut 74 secured to its other end. Each of the brace members 68 includes an extendible end portion 76 in the form of a screw member including a threaded end portion 78 threadedly engaged through the corresponding nut 74 and a headed end portion 80 rotatably received through one of the apertures 66 formed in the mounting flange portion 64 and provided with an abutment collar 82 affixed on the extendible end portion 76 a spaced distance from the head end portion 80 thereof.

The mounting flange portions 64 are thereby disposed on the extendible end portions 76 intermediate the head end portions 80 and abutment collars 82 thereof so as to prevent excessive longitudinal shifting of the extendible end portions 76 relative to their supporting mounting flange portions 64.

Thus it may be seen that the screw members or extendible end portions 76 may be rotated to cause the brace members 68 to be extended or contracted as desired.

Each of the support legs 50 includes a ground-engaging foot member 86 in the form of a bearing plate 88 including a pair of apertured upstanding mounting lugs 90 between which the corresponding sleeve 56 is secured and a suitable pivot fastener 92 is secured through each pair of mounting lug portions 90 and the corresponding sleeve 56 in order to pivotally secure the pressure feet 86 on the support legs 50.

In operation, when the trailer 10 is in transit, the brace members 68 are fully extended to the positions thereof illustrated in FIGURE 4 of the drawings whereupon the free ends of the support legs 50 and the pressure feet 86 supported therefrom will be swung to raised positions appreciably above the supporting surface 96 upon which the axle assemblies 12 and 14 rest.

When it is desired that the trailer 10 be braced and part of its weight be lifted from the axle assemblies 12 and 14 whenever the trailer 10 is not in transit, the noncircular head end portions 80 may be engaged by a suitable wrench or the like and rotated so as to shorten the effective length of the brace members 68 and cause the free ends of the support legs 50 to swing downwardly from the positions thereof illustrated in FIGURE 3 of the drawings toward the positions thereof illustrated in FIGURES 1, 2 and 4 of the drawings. As the free ends of the support legs 50 swing downwardly, the pressure feet 86 are moved into engagement with the supporting surface 96 and a portion of the weight of the trailer 10 is transferred from the axle assemblies 12 and 14 to the pressure feet 86. Of course, there are three jack structures 20 illustrated as supported from the trailer 10 with two of the jack structures 20 being disposed forwardly of the axle assemblies 12 and 14 and one of the jack structures 20 disposed rearwardly of the axle assemblies 12 and 14.

Inasmuch as the support legs 50 to which portions of the weight of the trailer 10 are transferred extend downwardly and outwardly from opposite sides of the trailer 10 and are each cross braced toward the opposite side of the trailer 10, an extremely rigid support for the trailer 10 is provided. Of course, if the surface 96 is uneven, the support legs 50 of each jack structure 20 may be differently inclined so as to compensate for the uneven surface from which the trailer 10 is to be supported.

The jack structures 20 are extremely versatile in that they may be readily secured to all trailers or vehicle frames including longitudinal members such as longitudinal members 16 and 18. In addition, the adjustability of the mounting structure 22 enables the jack structures 20 to be secured to frames whose longitudinal members are spaced varied distances apart and whatever number of jack structures 20 is deemed necessary may be utilized on any one vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A jack structure adapted for use in leveling and steadying house trailer frames, said structure comprising mounting means including horizontally spaced first and second portions adapted for securement to corresponding sections of a house trailer frame disposed on opposite sides of the longitudinal axis of the frame, first and second support legs pivotally secured at one pair of corresponding ends to said first and second portions for rotation about horizontal axes disposed generally normal to a line extending between said portions, and first and second inclined extendible length members oscillatably secured at one pair of corresponding ends thereof to said first and second portions for oscillation about axes generally paralleling the first-mentioned axes and pivotally secured at the other pair of corresponding ends thereof to the free end portions of said second and first support legs, respectively, said extendible length members comprising screw jack members whose one pair of corresponding ends are also supported from said portions for rotation about the longitudinal axes of said screw jack members.

2. The combination of claim 1 wherein said mounting means portions are connected by means of an adjustable structure operable to vary the spacing between said portions.

3. The combination of claim 1 including noncircular end portions on said one pair of corresponding ends of said screw jack members with which a wrench may be engaged for extending and shortening said screw jack members.

4. The combination of claim 1 wherein said first and second portions of said mounting means comprise angle members adapted to embrace and be secured to longitudinal members of said frame.

5. In combination with a vehicle frame including opposite side portions, a pair of upstanding support legs oscillatably supported at their upper ends from corresponding opposite side portions of said frame for swinging movement of the free lower ends of said legs about axes extending longitudinally of said frame, and extendible length members pivotally secured at one pair of ends to opposite side portions of said frame for oscillation about axes generally paralleling the first-mentioned axes and at their other end each to the lower free end portion of the leg supported from the opposite side of the frame, said extendible length members comprising screw jack members also journaled at said one pair of ends thereof for rotation about axes extending longitudinally of said screw jack members.

6. In combination with a vehicle frame including opposite side portions, a pair of downwardly and oppositely outwardly inclined support legs oscillatably supported at their upper ends from corresponding opposite side portions of said frame for swinging movement of the free lower ends of said legs about axes extending longitudinally of said frame, and extendible length members pivotally secured at one pair of ends to opposite side portions of said frame for oscillation about axes generally paralleling the first-mentioned axes and at their other ends each to the lower free end portion of the leg supported from the opposite side of the frame, said support legs being V-shaped in configuration each opening toward their upper ends.

7. The combination of claim 6 wherein the other pair of ends of said extendible length members are pivotally secured to brace members extending between and secured to the arms of the corresponding support legs adjacent the apices thereof.

8. The combination of claim 6 including pressure foot members pivotally secured to the lower ends of said support legs.

9. The combination of claim 6 wherein said extendible length members are contained in upstanding planes disposed generally normal to the axes of oscillation of said support legs relative to said frame.

References Cited

UNITED STATES PATENTS

| 3,096,065 | 7/1963 | Horne | 254—80 X |
| 3,236,501 | 2/1966 | McKay | 254—86 |
| 3,384,349 | 5/1968 | Johnson | 254—126 |

FOREIGN PATENTS 690,707   4/1953   Great Britain.

ROBERT C. RIORDON, Primary Examiner

D. R. MELTON, Assistant Examiner

U.S. Cl. X.R.

280—150.5